United States Patent [19]

Williams, III et al.

[11] 4,310,139
[45] Jan. 12, 1982

[54] ANNULAR BLOWOUT PREVENTER

[75] Inventors: Bolie C. Williams, III, Richard M. Church, Jr.; both of Houston, Tex.

[73] Assignee: Cameron Iron Works, Inc., Houston, Tex.

[21] Appl. No.: 137,549

[22] Filed: Apr. 4, 1980

[51] Int. Cl.³ .................................... E21B 33/06
[52] U.S. Cl. ................................... 251/1 B; 251/5; 277/103; 277/188 A; 277/235 R
[58] Field of Search ............... 251/1 B, 5, 212; 277/31, 103, 188 A, 235 R, 38; 166/84

[56] References Cited

U.S. PATENT DOCUMENTS

| | | | |
|---|---|---|---|
| 2,148,844 | 2/1939 | Stone et al. | 277/73 |
| 2,812,197 | 11/1957 | Gibson | 277/73 |
| 2,846,178 | 8/1958 | Minor | 251/1 B |
| 3,572,627 | 3/1971 | Jones et al. | 251/1 B |
| 3,572,628 | 3/1971 | Jones | 277/235 R |
| 3,667,721 | 6/1972 | Vujasinovic | 277/73 |
| 3,897,071 | 7/1975 | Le Rouax | 277/188 A |
| 3,915,426 | 10/1975 | Le Rouax | 251/1 B |
| 3,994,472 | 11/1976 | Williams | 251/1 B |
| 4,007,904 | 2/1977 | Jones | 251/1 B |
| 4,092,010 | 5/1978 | Carlson, Jr. | 251/212 |
| 4,099,699 | 7/1978 | Allen | 251/1 B |

Primary Examiner—H. Jay Spiegel
Attorney, Agent, or Firm—Vinson & Elkins

[57] ABSTRACT

An annular blowout preventer having a housing with a vertical bore therethrough, a packer including a resilient annulus and upper and lower series of irising metal inserts adapted to increase the support for the annulus when it is compressed axially to constrict the vertical bore and an annular piston movable in the housing to apply an axial compression load to the packer.

14 Claims, 8 Drawing Figures

ANNULAR BLOWOUT PREVENTER

BACKGROUND

Blowout preventers are used to control pressure within oil and gas wells during drilling and completion of the well. Annular blowout preventers, the type to which the present invention relates, include a single annular resilient packing positioned within a body having means to cause the packing to be moved into sealing engagement with a portion of a pipe string extending through the preventer or against itself to seal a well when no pipe string extends through the preventer.

An annular blowout preventer is shown and described in U.S. Pat. No. 3,572,627 to Jones et al. The packer has a resilient annulus with a circular series of rigid inserts extending through the packer and having irising end flanges on both ends which move to provide end support for the resilient annulus when it is compressed radially inward by pistons. These pistons are positioned around the resilient annulus to provide a direct inwardly directed radial force on the resilient annulus. Other annular preventers have utilized an axial compression of the resilient annulus to cause it to move radially inward to sealing positions. U.S. Pat. Nos. 4,099,699, 2,287,205, 3,667,721, 3,323,773, 2,148,844, 2,812,197 and 2,846,178 are examples of annular blowout preventers of the prior art.

The application of an axial force on the resilient annulus of an annular blowout preventer is simpler and less expensive than the application of a relatively uniform radial force to the resilient annulus. The use of an axial force with the resilient annulus of the above cited Jones et al patent would not be suitable as the rigid inserts would prevent effective compression of the annulus.

SUMMARY

The present invention provides an improved annular blowout preventer with an improved annular packer. The preventer includes a housing, a piston for the application of an axial force to the annular packer. The packer includes a resilient annulus with a circular series of rigid inserts embedded in its upper face so that the inner ends of the inserts move inward as the resilient annulus is moved inward to provide upper support for the resilient annulus. Another circular series of inserts may be embedded in the lower face of the resilient annulus.

An object of the present invention is to provide an improved annular blowout preventer of simple construction and relatively long service life.

Another object is to provide an improved annular packer for an annular blowout preventer having inwardly moving upper support when the resilient annulus is moved inwardly.

A further object is to provide an improved packer which has improved protection from extrusion when closed and holding pressure.

Still another object is to provide an improved annular blowout preventer in which the strain on the elastomer portion of the packer when actuated is minimized.

A still further object is to provide an improved annular blowout preventer which can actuate many times to sealed position without incurring such damage as would render it unfit for continued use.

BRIEF DESCRIPTION OF THE DRAWINGS

These and other objects and advantages are hereinafter set forth and explained with reference to the drawings wherein.

DESCRIPTION OF THE PREFERRED EMBODIMENT

Figure 1:
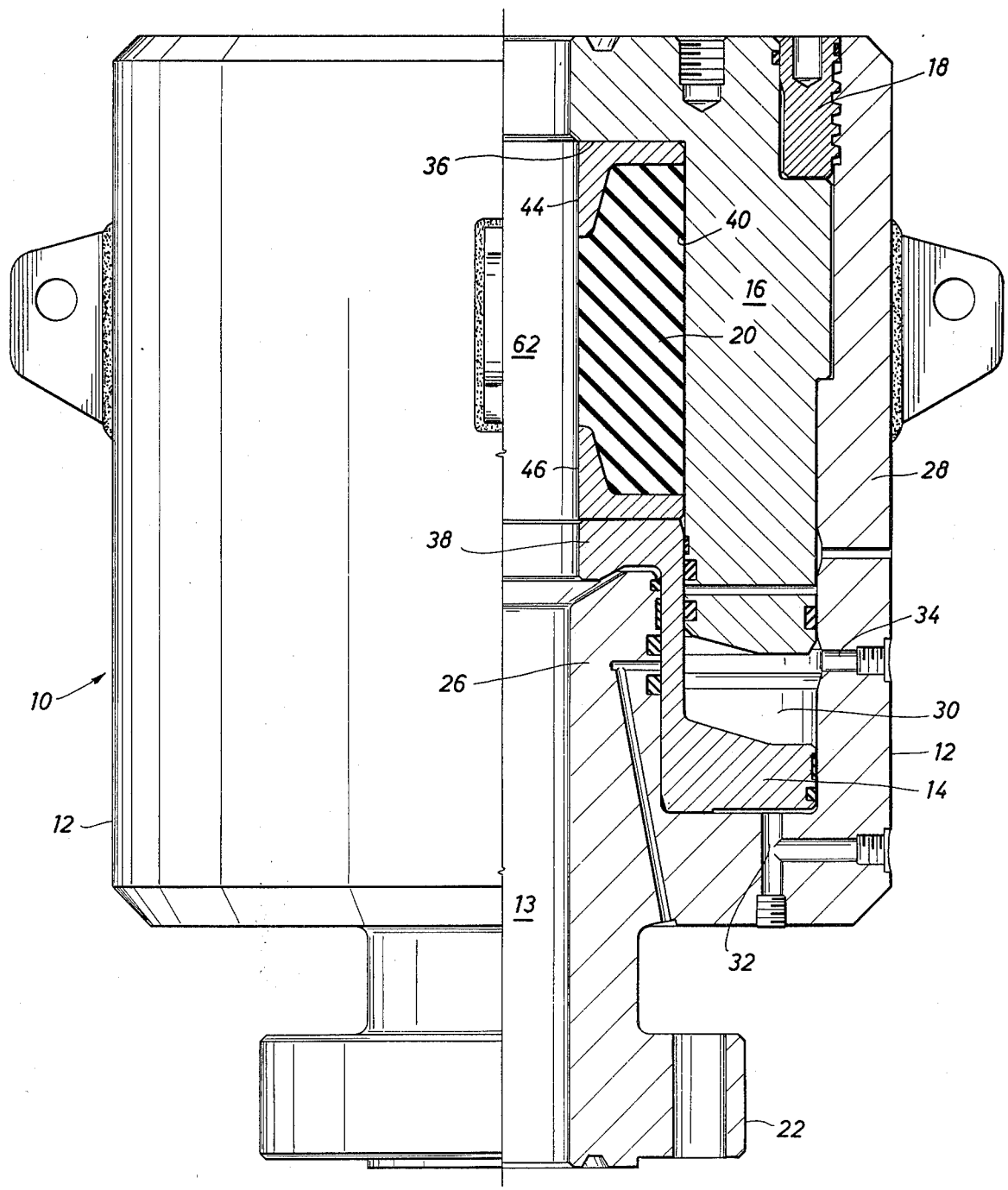
FIG. 1 is a view partly in elevation and partly in section of the preferred form of the improved annular blowout preventer of the present invention with its packer in relaxed or open position.
Figure 2:
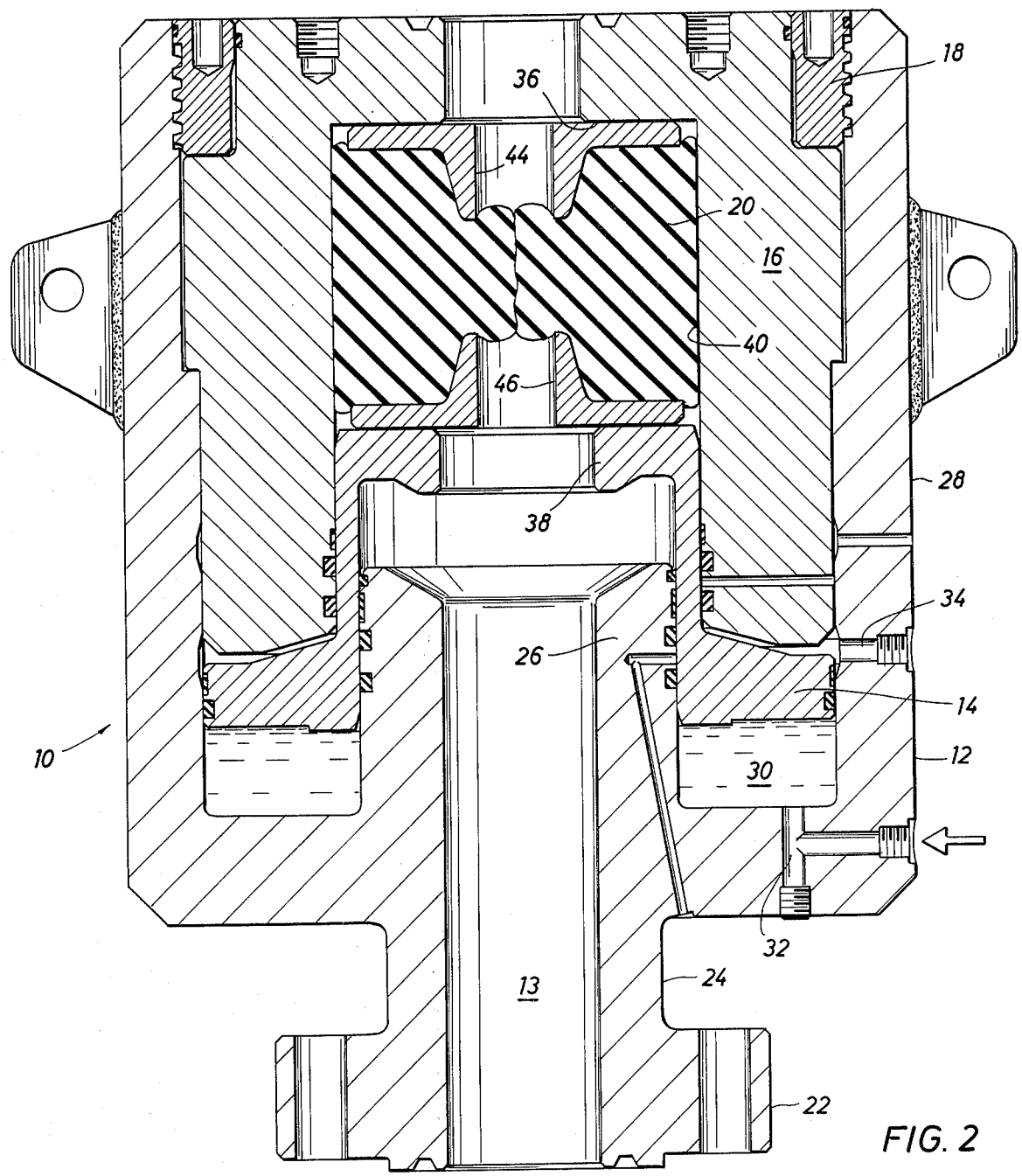
FIG. 2 is a view similar to FIG. 1 but showing the preventer packer in closed sealed position.

Improved annular blowout preventer 10 as shown in FIGS. 1 and 2 includes annular housing 12 with vertical bore 13 therethrough, annular piston 14, retainer ring 16, lock ring 18 and packer 20. Housing 12 includes lower flange 22 connected to neck 24, annular rim 26 extending upwardly from neck 24 and exterior annular housing section 28 which extends radially outward from neck 24 and upwardly around and spaced from rim 26. Chamber 30 is the annular space between rim 26 and section 28 below the lower end of retainer ring 16. Piston 14 is movably positioned partially within chamber 30 as shown. Passage 32 extends through housing section 28 into chamber 30 to deliver fluid under pressure to the lower side of piston 14 causing it to move upward and to exhaust fluids as piston 14 moves downward. Passage 34 extends through housing section 28 into chamber 30 to deliver fluid under pressure to the upper side of piston 14 causing it to move downward and to exhaust fluids as piston 14 moves upward.

Packer 20 is annular in shape, as hereinafter described, is positioned within the recess under shoulder 36 of retainer ring 16, and is engaged on its lower end by annular arm 38 of piston 14. Thus, as piston 14 moves upward, its arm 38 exerts an axial force on packer 20. Shoulder 36 prevents upward movement of packer 20 and inner surface 40 of retainer ring 16 prevents radial outward movement of packer 20 whereby the packer is moved to its closed or sealed position as shown in FIG. 2.

Figure 7:
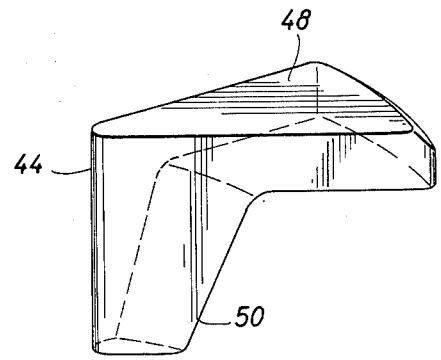
FIG. 7 is an isometric view of one of the preferred rigid inserts in the packer.
Figure 3:
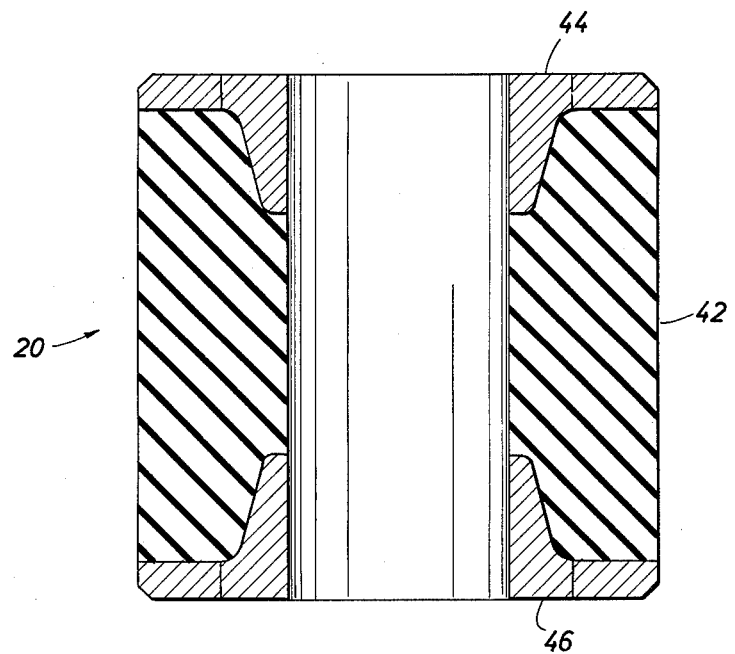
FIG. 3 is a longitudinal sectional view of the preferred packer of the present invention.
Figure 4:
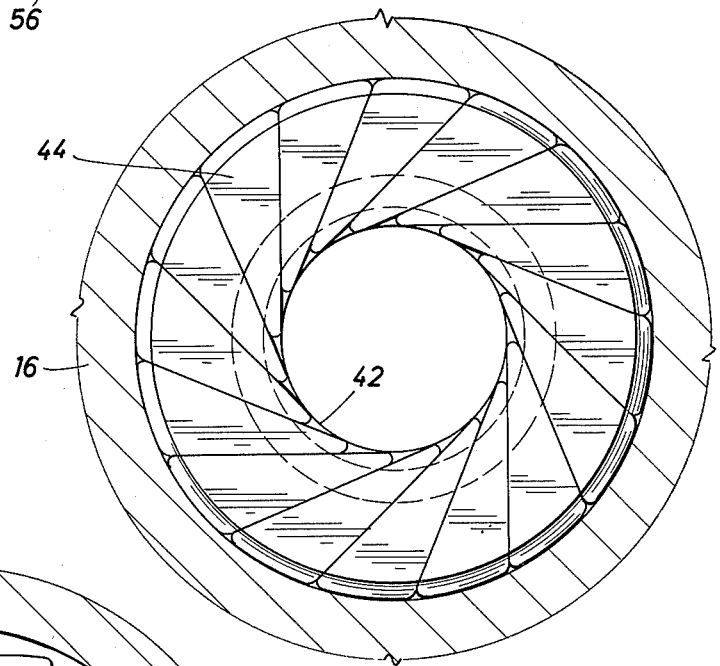
FIG. 4 is a top plan view of the packer in its relaxed or open position.
Figure 5:
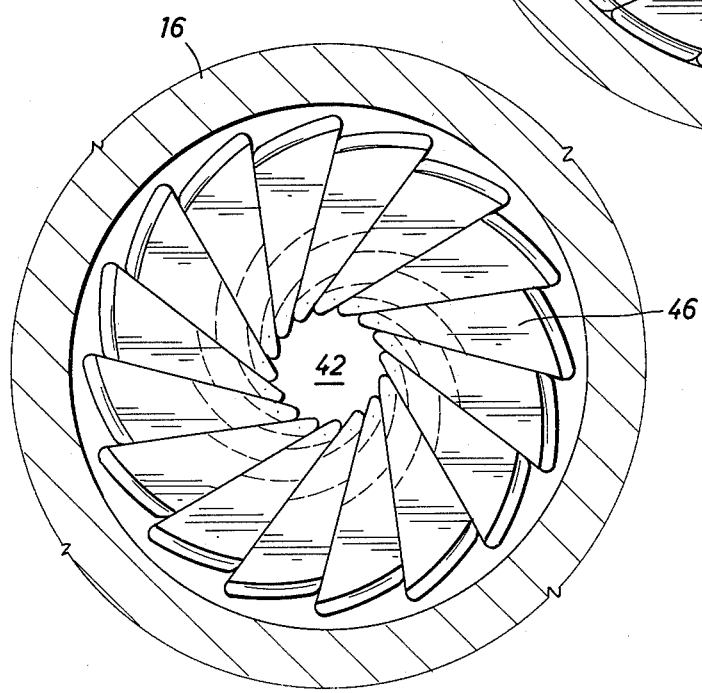
FIG. 5 is a view similar to FIG. 3 with the packer in its closed or sealed position.

Packer 20 is illustrated in greater detail in FIGS. 3, 4, 5 and 6 and includes resilient annulus 42, an upper circular series of rigid inserts 44 arranged on, bonded to, and embedded in the upper surface of annulus 42 and a lower circular series of rigid inserts 46 bonded to the lower surface of and embedded in annulus 42. Rigid inserts 44, as best seen in FIG. 7, include flat triangular shaped body 48 with stem 50 depending from the inner or apex end of body 48. Stem 50 extends downward within the inner surface of annulus 42 and is sufficiently long to assure that it is moved inwardly with the movement of annulus 42 and to assure that the inner end of body 48 is pivoted inwardly as shown in FIG. 5. Also, stem 50 terminates a substantial distance from the upper ends of the stems of lower inserts 46 so that a sufficient amount of annulus 42 is unrestricted to allow it to seal as shown in FIG. 2. In the relaxed open position of the annulus, as shown in FIG. 4, the triangular shaped bodies 48 are skewed to the axis of the packer and abut each other, so that as the annulus moves to closed position, as shown in FIG. 5, the inserts 44 are caused to rotate in irising fashion to less skewed positions. This increases support for the annulus by increasing the effective radial lengths (i.e. radial extents) of the inserts.

Figure 6:
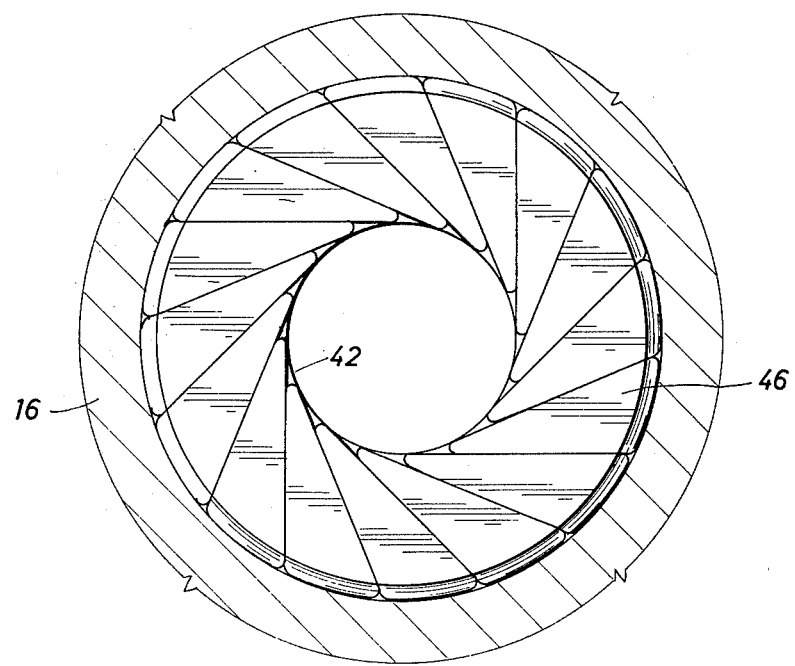
FIG. 6 is a bottom view of the packer shown in FIG. 3.

Rigid inserts 46 may be the same as inserts 44 or may be substantially the same as inserts 44 except that, as shown in FIG. 6, they are the reverse of inserts 44 so that they have the same relative movement as inserts 44. It is believed that using rigid inserts 46 which are identical to inserts 44 may be advantageous. When actuated the opposite rotation of inserts 46 from inserts 44 will impart a slight twist to annulus 42. This twisting of annulus 42 is believed to assist annulus 42 in closing on a well pipe or on itself.

As discussed, the movement of resilient annulus 42 when compressed causes a pivoting movement of body 48 of inserts 44 to provide the support for the upper end of resilient annulus 42. This movement of bodies 48 can be termed an irising action since it does cause a reduction in the diameter of the effective support by inserts 44. Inserts 46 have a similar irising action.

Figure 8:
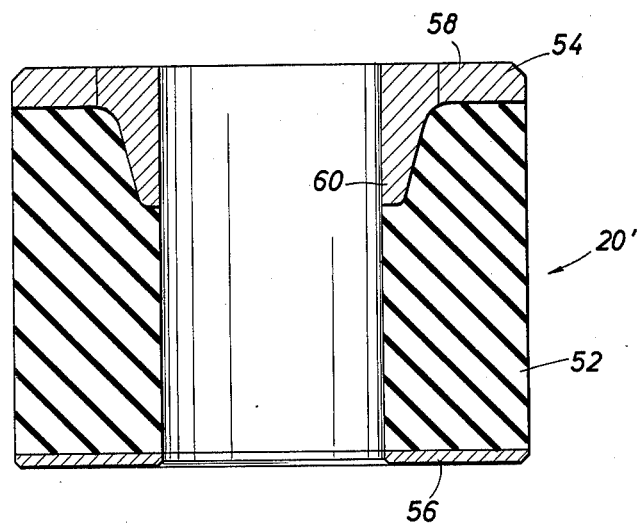
FIG. 8 is a longitudinal sectional view of a modified form of packer.

Modified packer 20' shown in FIG. 8 includes resilient annulus 52, a circular series of rigid inserts 54 arranged on, bonded to and embedded in the upper surface of annulus 52 and ring 56 bonded to the lower surface of annulus 52. The inserts 54 are similar to inserts 44 shown in FIGS. 3 and 7, and include flat, triangular-shaped body 58 with stem 60 depending from the inner or apex end of body 58.

During normal well operations piston 14 is in its lower position and packer 20 is relaxed providing a full bore 62 which is at least as large as bore 13 as shown in FIG. 1. When it is desired that preventer 10 be closed, pressure is supplied through passage 32 into chamber 30 and passage 34 is connected to a suitable exhaust (not shown). This causes piston 14 to move upward so that arm 38 compresses packer 20. This compression moves annulus 42 inwardly as shown in FIG. 2. Also, inserts 44 and 46 pivot to the position shown in FIG. 5 to increase the support of the central portion of annulus 42. Relaxation of annulus 42 is provided by relieving the pressure under piston 14 through passage 32 and applying pressure above piston 14 through passage 34. This causes piston 14 to move to the position shown in FIG. 1 and allows packer 20 to return to its full open position.

What is claimed is:

1. A packer for use in an annular blowout preventer having means for axially compressing the packer comprising an annulus of resilient material having an inner periphery, and a substantially circular series of rigid inserts which are arranged on and bonded to the upper end of the annulus, said inserts having a flat body portion and a stem portion depending from the inner ends of the body portion, the flat body portion of said inserts being generally perpendicular to the axis of said annulus with the radially innermost ends of the body portions being substantially adjacent the inner periphery of said annulus when the annulus is unconstricted and being generally triangular shaped, skewed to the packer axis, and in abutment with each other and the stem portion extending a distance downward in the annulus substantially less than the compressed length of the annulus when sealed, said inserts being responsive to the axial compression of said material to cause said inserts to pivot to a position with their inner ends supporting a reduced diameter of said annulus, as said inner periphery is constricted with radial inward movement of said material when it is compressed axially.

2. A packer according to claim 1 including a substantially circular series of rigid inserts which are arranged on and bonded to the lower end of the annulus.

3. A packer according to claim 2 wherein said lower inserts are identical to said upper inserts.

4. A packer according to claim 2 wherein said lower inserts are the reverse of said upper inserts.

5. A packer according to claim 1 including a ring bonded to the lower surface of the annulus.

6. A packer for an annular blowout preventer having a housing with an annular piston therein for exerting an axial compression force, said packer comprising an annular resilient body having an inner periphery, a plurality of rigid inserts embedded in the upper end of said body, each of said inserts having a stem depending from its inner end and embedded in said annular resilient body adjacent its inner periphery, said stem being shorter than the axial length of said resilient body and sufficiently long to cause said inserts to pivot and to move their inner ends radially inward, with the movement of the resilient body responsive to its axial compression, to positions supporting a substantial portion of the resilient body.

7. A packer according to claim 6 including a plurality of rigid inserts embedded in the lower end of said body, each of said inserts having a stem extending upward and terminating a sufficient distance from the upper stems so that said body may move to its inner sealing position.

8. An annular blowout preventer comprising an annular housing having an axially extending annular chamber therein, an inwardly projecting shoulder and ports extending through said housing into opposite ends of the chamber, an annular packer on the interior of said housing with one end against said housing shoulder, and an annular piston in said chamber and having an arm engaging the end of the packing opposite to the end engaging the housing shoulder, alternate application of pressure to opposite ends of said chamber moving said piston against said packing to compress it between the piston and housing shoulder into inwardly sealing position and away from the housing shoulder to allow said packer to relax to its open position, said packer comprising a resilient compressible annulus an inner periphery, and a plurality of irising inserts embedded in the upper end of the resilient body and including stem means extending partially along the length of the body on its inner periphery a distance substantially less than the axial length of the body when fully compressed.

9. An annular blowout preventer comprising
housing with a vertical bore therethrough and having an annular chamber and an inner shoulder facing in the direction of the annular chamber,
an annular resilient packer positioned against said shoulder,
an annular piston positioned in said chamber and having an arm extending from said chamber to engage the end of said packer away from said shoulder,
means for delivering and exhausting fluids under pressure from opposite sides of said piston within said chamber to cause axial movement of said piston,
said packer including
a resilient annulus having an inner portion and an outer portion, and
a substantially circular series of irising inserts embedded in the upper end of said annulus, skewed to the packer axis and in abutment with each other,
said inserts having triangular shaped flat bodies and stems extending from the inner apex end of the bodies, said stems extending through the inner portion of the annulus a sufficient distance, to assure that the inserts are moved inwardly in an irising action with the inward movement of the resilient annulus, and terminating a sufficient distance from the opposite end of annulus, to assure that a sufficient amount of said annulus is unrestricted for sealing responsive to axial compression.

10. An annular blowout preventer according to claim 9 including
a substantially circular series of irising inserts embedded in the lower end of said annulus,
said lower inserts having triangular shaped flat bodies and stems extending from the inner apex end of the bodies, said stems extending upward through the inner portion of the annulus a sufficient distance, to ensure that the inserts are moved inwardly in an irising action with the inward movement of the annulus, and terminating a sufficient distance from the lower end of the upper stems, to assure that a sufficient amount of said annulus is unrestricted for sealing responsive to axial compression.

11. An annular blowout preventer according to claim 10 wherein
said lower inserts are identical to said upper inserts.

12. An annular blowout preventer according to claim 10 wherein
said lower inserts are the reverse of said upper inserts.

13. An annular blowout preventer according to claim 10 including
a ring embedded in the lower end of said annulus.

14. An annular blowout preventer comprising
an annular housing having a vertical bore and an inner shoulder facing an annular recess about the bore,
an annular resilient packer positioned in the recess with one end against said shoulder,
an annular piston positioned in a chamber below said recess and having annular means engaging the other end of the packer,
means for delivering and exhausting pressure fluid to and from opposite sides of the piston to cause axial movement of the piston,
said packer including
a resilient annulus having an inner portion and an outer portion, and
a substantially circular series of irising inserts embedded in said one end of the annular resilient packer,
said inserts having triangular shaped flat bodies with stems extending from the inner apex ends of the bodies, said stems extending through the inner portion of the annulus a sufficient distance to ensure that the inserts are moved inwardly in an irising action with the inward movement of the resilient annulus, and said stems terminating a sufficient distance from said other end of the annulus, to ensure that a sufficient amount of the resilient material is allowed to move to sealing position.

* * * * *